(12) United States Patent
Turpin et al.

(10) Patent No.: US 7,756,424 B2
(45) Date of Patent: Jul. 13, 2010

(54) OPTICAL CDMA COMMUNICATIONS SYSTEM USING OTDL DEVICE

(75) Inventors: Terry M. Turpin, Columbia, MD (US); James L. Lafuse, Columbia, MD (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 478 days.

(21) Appl. No.: 10/051,229

(22) Filed: Jan. 22, 2002

(65) Prior Publication Data
US 2002/0105705 A1  Aug. 8, 2002

Related U.S. Application Data

(60) Provisional application No. 60/263,307, filed on Jan. 22, 2001.

(51) Int. Cl.
*H04B 10/00* (2006.01)
(52) U.S. Cl. .................. 398/201; 398/212; 398/141
(58) Field of Classification Search ......... 398/140–150, 398/182, 201, 202, 212
See application file for complete search history.

(56) References Cited

U.S. PATENT DOCUMENTS

| | | | |
|---|---|---|---|
| 5,867,290 A | 2/1999 | Eutt et al. | |
| 6,185,040 B1 * | 2/2001 | Shirasaki et al. | 359/578 |
| 6,285,500 B1 * | 9/2001 | Ranalli et al. | 359/497 |
| 6,288,810 B1 | 9/2001 | Grasso et al. | |
| 6,289,148 B1 | 9/2001 | Lin et al. | |
| 6,292,299 B1 | 9/2001 | Liou | |
| 6,310,994 B1 | 10/2001 | Jones et al. | |
| 7,002,696 B1 * | 2/2006 | Miron | 356/519 |
| 2001/0024542 A1 | 9/2001 | Aina et al. | |
| 2001/0030786 A1 | 10/2001 | Takahashi et al. | |
| 2001/0038734 A1 | 11/2001 | Kim et al. | |

FOREIGN PATENT DOCUMENTS

| | | |
|---|---|---|
| JP | 9-43057 | 9/1997 |
| WO | WO-01/01173 A1 | 4/2001 |
| WO | WO 02/03123 | 1/2002 |

OTHER PUBLICATIONS

L. Ngyuen et al. "All-Optical CDMA with Bipolar Codes" Electronics Letters, vol. 31, No. 6, Mar. 1995, pp. 469-470.
Yu et al. "Wavelength-Time Spreading Optical CDMA System Using Wavelength Multiplexers and Mirrored Fiber Delay Lines" IEEE Photonics Technology Letters, vol. 12, No. 9, Sep. 2000, pp. 1278-1280.

* cited by examiner

*Primary Examiner*—Agustin Bello
(74) *Attorney, Agent, or Firm*—Tarolli, Sundheim, Covell & Tummino LLP

(57) ABSTRACT

An optical code division multiple access communication system using a processor processes at least one collimated input beam which has been modulated with a data signal to produce multiple time-delayed output beams. The multiple time-delayed output beams are spatially distributed and independently phase shifted. An integration lens receives the phase modulated output beams and reintegrates the phase modulated output beams into a single encoded beam with a time series chip sequence. The integrated encoded beam is transmitted. A receiving system includes a processor to process the encoded collimated light beams received from a transmitter to produce multiple time-delayed output beams. The multiple time-delayed output beams are spatially distributed and independently phase shifted. An integration lens receives the phase-shifted output beams and reintegrates the phase-shifted output beams into a single decoded beam.

38 Claims, 8 Drawing Sheets

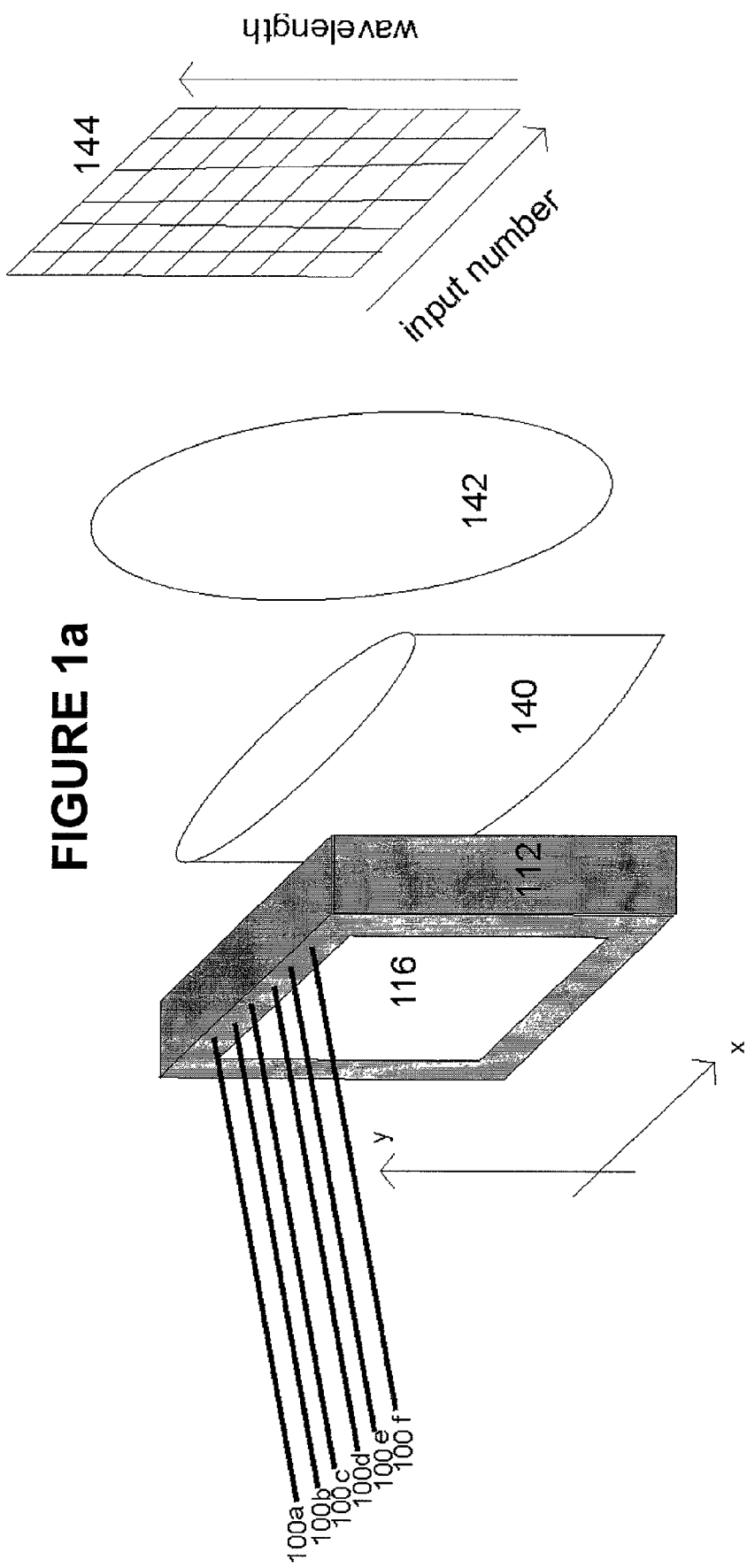

OPTICAL CDMA COMMUNICATIONS SYSTEM USING OTDL DEVICE

FIELD OF THE INVENTION

The invention relates to a method and apparatus for optical communication systems and, more specifically, for optical code-division multiple access communications systems that transmit data over optical fibers.

BACKGROUND OF THE INVENTION

Code-Division Multiple Access (CDMA) is a spread spectrum encoding method that enables many users to simultaneously transmit separate signals over the same spectral bandwidth. In CDMA, a data signal of bandwidth D is modulated by a higher rate coded waveform of bandwidth C. The resulting signal has a bandwidth of D+C, which, for large ratios of C to D is approximately equal to C. The ratio C/D is commonly referred to as the spreading ratio, the spreading gain, or the processing gain. The intended receiver modulates the received signal by an exact replica of the coded waveform to remove the code modulation and recover the data signal. The coded waveform may be any of many types but the primary one of interest here is a binary coded bi-phase modulation, also referred to as binary phase shift keying, or BPSK, modulation. The signaling rate of the coded spreading waveform is commonly called the chip rate.

The number of users that could occupy the same spreading bandwidth C is regulated by the processing gain of the high rate modulation, i.e., the ratio of the modulation rate to the data rate, C/D. In theory, this ratio is equal to the number of users. But in practice, due to the need to maintain low cross-correlation properties between the high rate sequences, the number of usable sequences, hence users, is somewhat less than the processing gain.

There has been considerable interest within the communications industry in recent years on the potential for Optical CDMA(OCDMA) to make more efficient use of the bandwidth available in fiber optic communications systems. The main problem with fiber optic systems is the inefficient nature of dedicated bandwidth allocation architectures. Many communications, particularly Internet Protocol communications, are extremely bursty. Therefore, as more users are added and depart, the bandwidth resource must be dynamically re-allocated. This may not be feasible.

The traditional method of signal processing used to address this problem in fiber optic systems is a frequency domain multiplexing protocol called wavelength division multiplexing (WDM). In WDM, the optical efficiency is increased by the creation of a plurality of wavelengths, each carrying a separate signal. Still, the number of wavelengths or channels that can be supported is constrained by the stability of each discrete wavelength and the tuning range of the diode laser. OCDMA is suggested as an alternative or in conjunction with WDM to increase the efficient use of fiber communications systems. The primary advantage of code division multiple access, as opposed to other optical multiple access or multi-pexing techniques, is the reduced requirement on coordination of exact timing and frequency allocations to the multiple users. In OCDMA, all of the users occupy the same time and frequency space and are precisely separated using their specific chipping code, a much simpler task.

Earlier inventions have been described to implement optical CDMA (OCDMA), which can be grouped in three categories: simple spectral domain methods, complex spectral domain methods, and time-domain based systems.

In a spectrally encoded OCDMA system, each user is identified by a particular pattern of spectral (frequency) components. These patterns can be encoded with a simple periodic optical filter, as disclosed by Pfeiffer in U.S. Pat. Nos. 5,784,506 and 6,215,573. In U.S. Pat. No. 5,784,506, Pfeiffer discloses an electronic decoding of the spectral encoded signal. In U.S. Pat. No. 6,215,573, Pfeiffer discloses an optical receiver with filtering characteristics for decreasing cross talk. In U.S. Pat. No. 5,867,290, Dutt et al. disclose a system whereby the spectrally encoded signal is created by selectively attenuating certain wavelengths from a broadband light source.

Typical OCDMA proposed systems use uni-polar codes that use plus ones (+1) and zeros (0), generally called on-off keying. Such codes are used because they are easily optically detected. This inherently reduces optical efficiency because a "0" code removes or discards available light. To increase optical efficiency, it is far better to use bi-polar codes, i.e. those consisting of plus one (+1) and minus one (−1). However, detection of bi-polar codes requires detection in the presence of an unmodulated reference beam, i.e., coherent detection. Coherent detection is difficult and expensive to achieve in a practical system.

The Dutt system is not very optically efficient due to the use of uni-polar codes and it has a limited code set. The Pfeiffer systems are more efficient but also have a limited code set resulting in a limited number of users.

In U.S. Pat. No. 5,760,941, Young et al. disclose a method and system for transmitting bi-polar codes using pairs of uni-polar codes. This method requires each of the pairs of uni-polar codes to be separately transmitted on separate fibers or opposite polarization.

In U.S. Pat. No. 6,236,483, Dutt et al. disclose a system based upon Young U.S. Pat. No. 5,760,941 with the addition of the use of sub-band encoding to divide the spectra into sub-groups.

Both the Dutt and Young systems are based upon attenuating the optical carrier using uni-polar codes. This scheme cannot achieve optimal optical efficiency.

In U.S. Pat. No. 6,313,771, Munroe et al. disclose an OCDMA system based upon use of fiber Bragg gratings to encode a short pulse into a sequence of plus one (+1) and minus one (−1) coded pulses, i.e., optically efficient bi-polar codes. In order to overcome inherent limitations of fiber Bragg gratings, this method specifically uses two stages of encoding to achieve a relatively long encoding pattern. This multi-stage system is complex to build and relies on two fiber Bragg gratings. This is less optically efficient than using a single grating.

In U.S. Pat. No. 6,292,282, Mossberg et al. disclose a time wavelength multiple access communication system whereby the optical signal of a user is separated into a small number of spectral bands. The resulting bands are transmitted in a specific time-sequence order. A decoder for a specific user removes the time sequencing of the spectral bands such that a signal from the intended user is time-aligned. The number of frequency bands, and hence, the number of available codes, and therefore users, is limited in a practical system.

In summary, the existing methods of OCDMA are not very efficient which yields a lower number of potential users. Furthermore, they rely upon grating technologies that have limited resolution. Lastly, some of the more efficient methods are complex and costly to manufacture.

SUMMARY OF THE INVENTION

The proposed Optical CDMA system is analogous to well-known radio frequency (RF) CDMA techniques, widely used in cellular telephones and many other places, and is enabled by the existence of the Optical Tapped Delay Line (OTDL) technology. The OTDL acts as a shift-register to provide parallel time-shifted outputs that can be operated on by conventional optical elements such as spatial light modulators, lenses and detectors. With the proper arrangement of elements, the required phase and/or amplitude encoding and decoding operations can be performed to implement an optical CDMA system.

The enabling characteristic of the OTDL is the capability to present a very long optical path within a small space and to permit a controlled tapping off of energy from the optical beam at uniform intervals. This capability is applied principally to achieve high resolution spectral separation. According to an embodiment of the present application, the capability enables a single short optical pulse to be passively converted into a large number of identical spatially distinct pulses at uniform time delays. Thus, each pulse replica may be independently modulated (coded) using simple spatial means, rather than using more complicated temporal means, prior to recombining into a time sequence of coded pulses. The long total time delay capability also means that rather low data rate signals, as low as 50 MHz, can be efficiently utilized.

The simple spatial modulation capability of the OCDMA application of OTDL enables the device of this embodiment to be low power since the OTDL is inherently a passive device and no active component needs to operate at the chip-rate. Further, the device of this embodiment is simple and requires fewer components than the prior art. As a result, the device has a lower cost to fabricate.

A single OTDL device can generate tens to hundreds of pulse replicas and, thus, support OCDMA systems with tens to hundreds of users. This is more users than the prior art systems. Further, since according to an embodiment of the invention, the OTDL device can be used in two dimensions, a cascade of a simple N tap one-dimensional devices, each with an N input by N tap two-dimensional device, produces $N^2$ pulse replicas, and, hence, can generate codes of length $N^2$ and support $N^2$ users. A forty tap one-dimensional device, for example, combined with a forty input two-dimensional forty tap device would support up to 1600 users on a single wavelength according to this embodiment. This is far higher than any previous technology.

An OTDL also has lower optical insertion loss compared to the spectral de-modulation techniques discussed in the prior art. In addition to the application of data transmission over fiber optic networks, OTDL-based systems have several other potential applications such as:

1. Switching and Routing in fiber networks: The OCDMA sequence could be used to superimpose routing information such that OCDMA encoded data packets will be detected only by the intended receiver.

2. Clock distribution and time epoch synchronization: Optical CDMA may be useful to transmit common clock and timing information in a TDMA system without using TDMA time-slots or the need for phase-locked clock recovery systems.

3. Wideband RADAR Signal Generation: Used within a coherently detected system with a frequency shifted reference beam, the transmitter can directly generate wideband spread-spectrum RF signals with effective chip rates in the 10's of GHz, useful in advanced radar systems.

4. Optical Equalizer: The OTDL is an optical transversal filter which can be implemented with electrically or optically programmable tap weights. This makes it possible to change the characteristics of the filter dynamically, for example to compensate for changes in transmission path. This allows all of the conventional electronic adaptive signal processing algorithms to be applied to optical networks. Many of these algorithms are outlined in "Theory and Design of Adaptive Filters" by Treichler, Johnson, and Larimore, Published by John Wiley & Sons. These algorithms enable dynamic equalization, interference rejection, echo cancellation and dynamic dispersion compensation (both chromatic and polarization). Also, dynamically adaptive transversal filters can be used to remove some nonlinear effects on optical fibers. Several of the prior art references note that such an optical analog of conventional electronic signal processing componentry would be desirable, but is not available.

In addition, the present invention has several technical advantages over other OCDMA methods. The present invention can provide increased efficiency by performing bi-phase shifting of light, or even higher order quadrature amplitude modulation (QAM) where multiple phase and amplitudes states are possible for each code pulse, as opposed to simple on-off keying. Also, according to this embodiment, the device is self-coherent, not requiring separate coherent reference and coherent detection for decoding. Further, high-rate code modulation can be produced without the need for high speed clocks.

According to an embodiment of the invention, a OTDL device is used as an encoder to produce a space integrating signal generator in which a time sequence of spatially separated optical pulses are derived from a short optical pulse. It is then possible, according to this embodiment, to produce controlled phase modulation on each pulse of the time sequence and then to combine the time series of pulses as a continuous stream for transmission on the optical fiber.

The process of this embodiment is then duplicated with the inverse of the code in reverse order to create a space-integrating receiver. In this embodiment, the encoded output from an optic fiber enters the OTDL. The encoded output is preferably the time sequence of modulated pulses produced by a number of space integrating signal encoders. The phase modulation is preferably programmed with the inverse reverse pattern of the phase pattern that produced the time sequence such that, as the time series of pulses progress through the OTDL, the phase modulator may undo the transmitted phase modulation. When the phase pattern of the pulses matches the pattern of the decoder, the exiting pulses are preferably all aligned in phase. When the phases are aligned, the integrated light beam preferably focuses to a point on the detector producing a peak output. At all other times, the light is defocused, i.e. spread out in space.

According to embodiments of the present invention, both fixed and programmable coding/decoding devices are possible.

According to another embodiment of the present invention, it is also possible to build a spectral domain signal encoder and decoder. In this embodiment, the CDMA signal is produced by modulating the constituent frequency components of the signal by placing an amplitude and phase modulator at the Fourier transform plane formed from the output of an OTDL device, fed with a constant broad spectrum light source.

The chip rate of the code is preferably determined by the construction of the OTDL device. The chip rate may be the inverse of the delay between the individual taps on the OTDL. The code length may be determined by the total number of taps in the OTDL device.

BRIEF DESCRIPTION OF THE DRAWINGS

A detailed description of some preferred embodiments of the present invention will be made with reference to the accompanying drawings, in which:

FIG. 1a illustrates an example of an Optical Tapped Delay Line according to an embodiment of the invention;

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating the general principles of the invention. The scope of the invention is best defined by the appended claims.

Figure 1B:
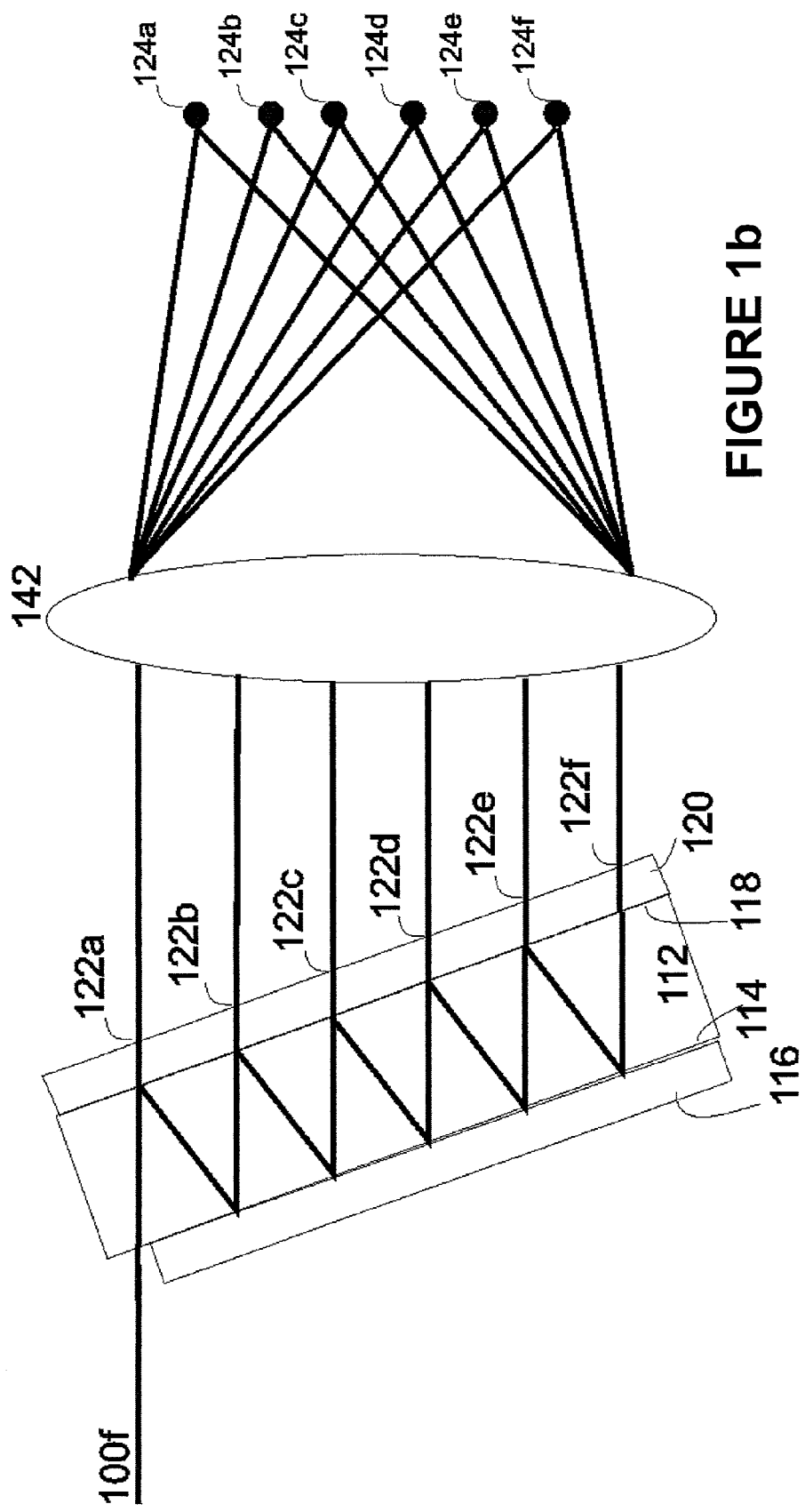
FIG. 1b illustrates an operational side view of an example of an OTDL device according to an embodiment of the invention.

FIGS. 1(a) and 1(b) illustrate an example of an OTDL device according to an embodiment of the invention. As illustrated in FIG. 1(a), six collimated input beams 100(a)-100(f) preferably enter an optical cavity 112. The optical cavity 112 may be a transparent plate having a desired thickness. The thickness of the cavity determines the free spectral range (FSR) of the device, i.e., the optical frequency ambiguity, or the optical frequency difference of wavelengths that appear at the same wavelength location in plane 144 as illustrated, for example, in FIG. 1(a). The origin of the beams may be, for example, the collimated outputs of six optical fibers (not shown) where each fiber typically carries multiple wavelength channels. The cavity 112 preferably has a first surface 114 that may be provided with a coating 116, which is substantially 100% reflective. The coating 116 preferably covers the majority of the surface 114 with the exception of a transparent window where the input beams 110(a)-(f) enter the device. The cavity 112 preferably has a second surface 118 that is opposed to the first surface 114. The second surface 118 is preferably provided with a coating 120 that is partially reflective.

According to an embodiment of the invention, the partial reflectivity of the second surface coating 120 is spatially varying. In another embodiment, which is not illustrated, the partial reflectivity of the second surface coating 120 may be substantially uniform.

The reflective surface coatings 116 and 120 are preferably on opposite sides of the optical cavity 112. The optical cavity 112 may be made of glass, other transparent materials or empty space.

The various output beams may then be directed to an anamorphic optical system that is preferably spaced apart from the optical cavity 112. In the illustrated embodiment, the anamorphic optical system comprises a cylinder lens 140 and a spherical lens 142. The anamorphic optical system 140, 142 preferably performs a Fourier transformation of the output of the cavity 112 in the vertical dimension y, and images the output of the cavity 112 in the horizontal dimension x onto an output surface 144. Although not illustrated in FIG. 1(a), it will be recognized that the optical system 140, 142 may have some form other than anamorphic as described above, depending on the particular application of the OTDL device.

FIG. 1(b) illustrates an operational side view of an example of the device shown in FIG. 1(a). The single input beam 100(f) illustrated in FIG. 1(b) corresponds to the input beam 100(f) illustrated as one of the multiple input beams 100(a)-(f) in FIG. 1(a). Although not illustrated in FIG. 1(b), it will be understood that the other multiple input beams 100(a)-(e) reside behind the input beam 100(f) in the view shown in FIG. 1(b), and that the device is capable of processing and channelizing all of the multiple input beams simultaneously.

Referring to FIG. 1(b), the input beam 100(f) preferably enters the cavity 112 as a collimated beam of light. After entering the cavity 112, a portion of the collimated input beam may exit the cavity at a first location or "tap" 122(a) as a collimated output beam. Another portion of the collimated input beam may be partially reflected by the coating 120 and then totally reflected by the coating 116. In other words, a portion of the beam "bounces" from the coating 120 to the coating 116 and then back again. This reflection or "bounce" produces a collimated output beam that preferably exits at a second location or tap 122(b). Tap 122(b) may be slightly displaced spatially from the first tap 122(a). As a result of the bounce, the distance traveled by the output beam 122(b) may be greater than the distance traveled by output beam 122(a). The width of the optical cavity 112 between reflective surfaces 116 and 120 may thereby introduce a time delay between adjacent taps. The reflective process continues, thereby preferably producing multiple additional collimated output beams 122(a)-(f). Preferably, beams 122(a)-(f) exit the cavity 112 at corresponding multiple tap locations. The result may be a series of output beams that are distributed in the y-direction with a progressive time delay from beam to beam.

Although not illustrated in FIG. 1(b), it will be recognized that a similar series of output beams distributed in the y-direction may be simultaneously produced for each one of the input beams 100(a)-(f). In other words, the device of this embodiment may be capable of operating on each one of the multiple collimated input beams independently of the other input beams. The device of this embodiment may therefore be referred to as a "two-dimensional" device. This is due to the fact that the device uses two different spatial dimensions to perform signal processing functions. A first dimension x preferably accommodates multiple independent collimated input beams that are all independently channelized along a second dimension y.

The various beams remain substantially collimated throughout the reflective process. Divergence of the beams and interference among the beams is minimized. Numerous internal reflections within the cavity 112 may be achieved without substantial divergence or interference.

Beam 122(a) may pass through a lens system 142 performing the Fourier transform. Beam 122(a) may illuminate the entire plane at 124. Similarly, all of the remaining beams 122(*b*)-(*f*) may pass through 142 and illuminate the entire plane at 124. The totality of beams illuminating plane 124 may create an interference pattern which will preferably coalesce a single wavelength at 124(*a*), a separate wavelength at 124(*b*) and, similarly, at 124(*c*)-(*f*). It will be understood that the number of wavelengths collected at plane 124 does not need to equal the number of beams exiting at plane 122. The continuous spectrum will preferably be generated at plane 124 and the discrete wavelengths will be present only if discrete wavelengths, or more accurately, narrow wavelength bands, are present in the input beam 100(*f*).

Figure 2:
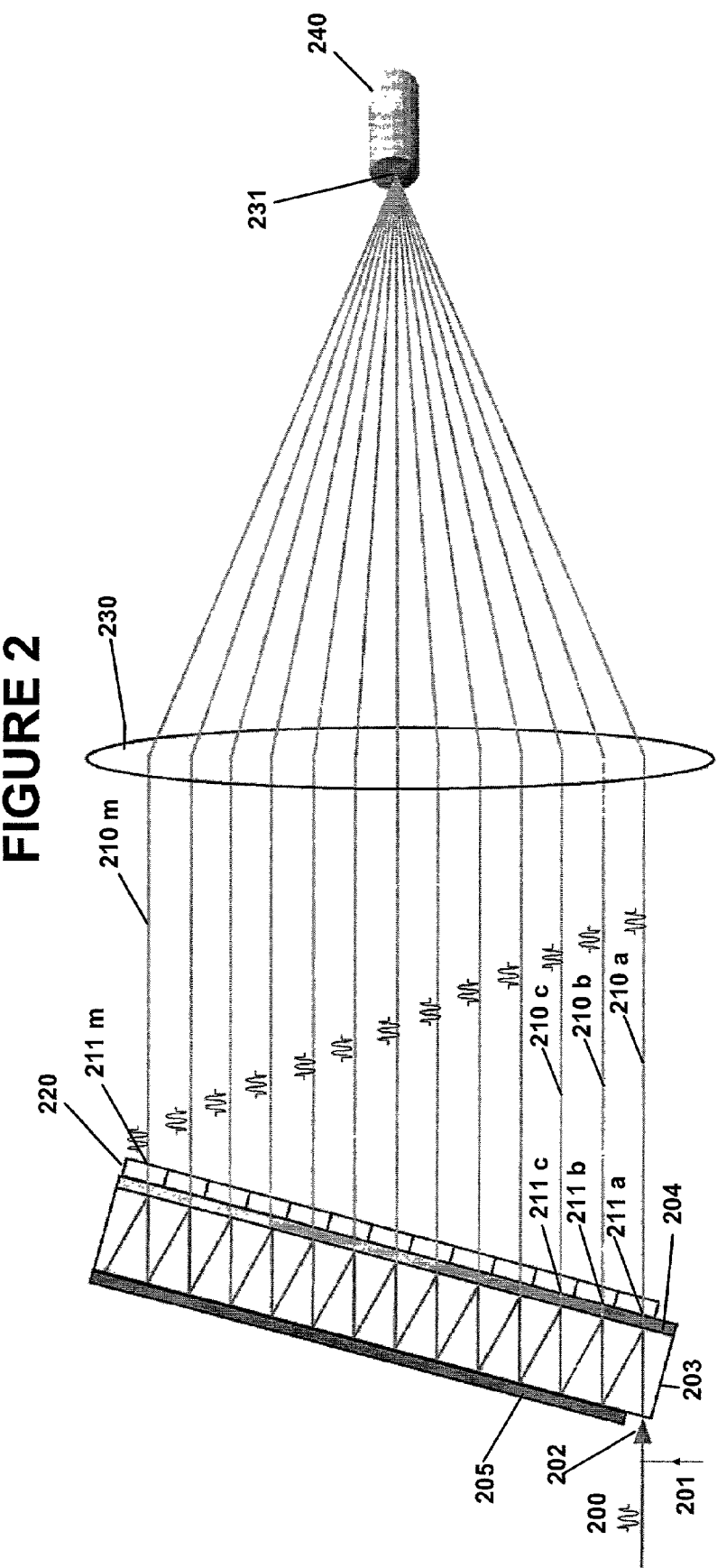
FIG. 2 illustrates an example of a modulation-on-exit space integrating encoder according to an embodiment of the invention.

FIG. 2 is an embodiment of the present invention that illustrates an example of a OCDMA encoder where each pulse of light exiting an OTDL device may be independently phase modulated by a spatial light modulator (SLM). FIG. 2 illustrates an example modulation-on-exit space-integrating encoder according to an embodiment of the invention. In FIG. 2, a coherent light pulse 200 may be modulated with a data signal 201 to produce an input beam 202. The input beam may enter an OTDL cavity 203. The OTDL cavity 203 may be as it is described above in conjunction with the description of FIGS. 1(*a*) and 1(*b*). The input beam may be partially reflected by a surface 204 of the cavity 203. The surface 204 is analogous to the second surface 118, as shown in FIG. 1(*b*). The surface 204 is partially reflective. A portion of the light may exit the cavity 203 at a tap 211(*a*) as beam 210(*a*). The reflected portion of the input beam preferably continues to a 100% reflectively coated surface 205. Surface 205 is analogous to surface 114 shown in the example illustrated in FIG. 1(*b*). Next, the input beam is preferably reflected back to the surface 204 at a next tap point 211(*b*). At this tap point, another portion of the beam preferably exits the cavity as beam 210(*b*). The input beam may continue to bounce between surfaces 204 and 205, with portions of the beam exiting the cavity 203 as beams 210(*c*)-(*m*). The reflective coating of surface 204 preferably varies in reflectivity along its length, with high reflectivity at the start and decreasing along its length, so as to ensure equal intensity of the exiting beams. The reflectivity may also vary such as to impart any other desired amplitude profile onto the beams.

Upon exiting surface 204, the beams may enter a phase modulator 220, where a unique phase shift is applied to each beam. The phase modulator may be loaded with the phase shifts that determine the OCDMA sequence. The phase modulator illustrated by way of example in FIG. 2 is programmable. The total number of delay taps preferably determines the length of the applied code sequence. After the beams have been phase modulated, they pass through an integration lens 230. At the integration lens 230, the beams may be reintegrated into a single beam. This is illustrated, for example, as the point labeled 231 in FIG. 2. The integrated beams may then enter an optical fiber 240 as an encoded beam with a time series chip sequence. Then, the encoded beam may be transmitted via an optical fiber 240.

Figure 3:
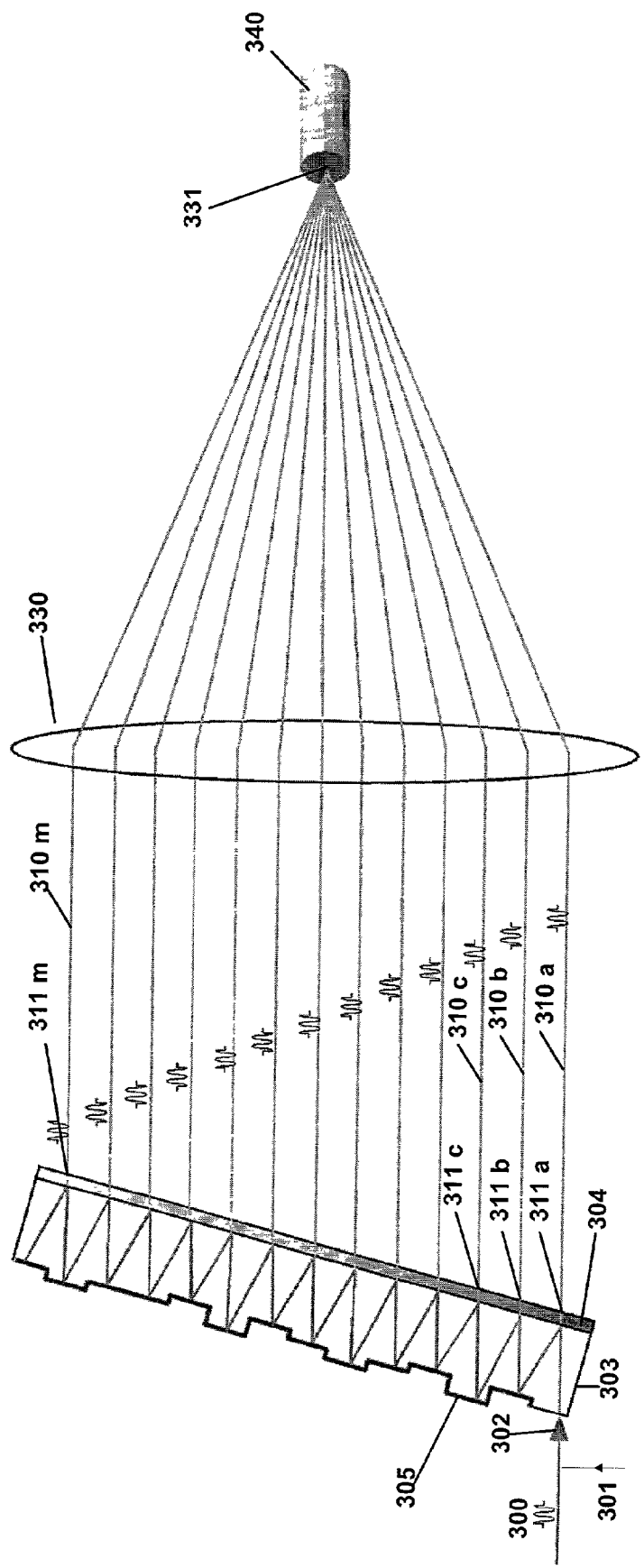
FIG. 3 illustrates an example of a modulation-on-reflection space-integrating encoder according to an embodiment of the invention.

The phase modulation may also be fixed by using an etched plate instead of the programmable modulator, as illustrated, for example, in FIG. 3. This may be accomplished by using an etched plate 305 where the etch depth produces a desired phase shift through time delay of the exiting light pulse. For bi-phase modulation, this depth is preferably either 0 or ¼ the wavelength of the light. Note that the front exiting surface 304 may be etched to produce the phase shifts. Note also that the phase pattern must be a differential pattern since tap N+1 already has the phase steps applied from taps 1 through N.

FIG. 3 illustrates an example of a modulation-on-reflection spaceintegrating encoder. FIG. 3 also depicts an example of an OCDMA encoder where the pulse of light traveling through an OTDL device is phase adjusted on a back surface 305 of the device.

Referring to FIG. 3, a coherent light pulse 300 is preferably modulated with a data signal 301 to create an input beam. The input beam preferably enters an OTDL cavity 303 and is partially reflected by surface 304. Cavity 303 and surface 304 are analogous to cavity 203 and surface 204, which are discussed above in conjunction with FIG. 2. A portion of the light may exit the cavity 303 at a first delay tap 311(*a*) as a beam 310(*a*). The reflected portion of the input beam preferably continues to a 100% reflective etched surface 305. The input beam reflected by the etched surface 305 is preferably phase adjusted based on the depth of the etched surface. Then, the beam may be reflected back to the partially reflective surface 304 at a next tap point 311(*b*). At tap point 311(*b*), another portion of the beam, which is now phase encoded, preferably exits the cavity 303 as a beam 310(*b*). The input beam may continue to bounce between surfaces 304 and 305. Portions of the beam may also exit the cavity 303 as beams 310(*c*) through 310(*m*).

The phase of the light exiting the device at each respective tap point 311(*a*)-(*m*), for example, is preferably equal to the accumulation of all phase adjustments up to that point. The programmed phase pattern may be the differential phase required to produce the desired phase at each tap point.

The reflective coating of surface 304 varies in reflectivity along its length, with high reflectivity at the start and decreasing along its length, so as to ensure equal intensity of the exiting beams. The reflectivity may also vary such as to impart any other desired amplitude profile onto the beams.

The total number of delay taps preferably determines the length of the applied code sequence. After the beams have been phase modulated, they may pass through an integration lens 330. There, the beams may be reintegrated into a single beam at 331. Thereafter, they may enter an optical fiber 340 as an encoded beam with a time series chip sequence. At this point, the encoded beam is transmitted via an optical fiber 340.

FIG. 3 illustrates an example of a fixed pattern modulator with the phase shifts etched into the reflective surface 305. The phase modulation may also be produced on the reflective surface 305 with a reflective spatial light modulator. This allows the phase pattern to be programmed. Alternatively, a micro-mechanical device, such as a piston, pressing on the surface 305 produces a local deformity. The local deformity at 305 may cause sufficient phase shift of the reflected light to also produce the phase modulation.

It should be understood that the transmitters described in FIGS. 2 and 3 can be implemented to produce identical output waveforms.

Figure 4:
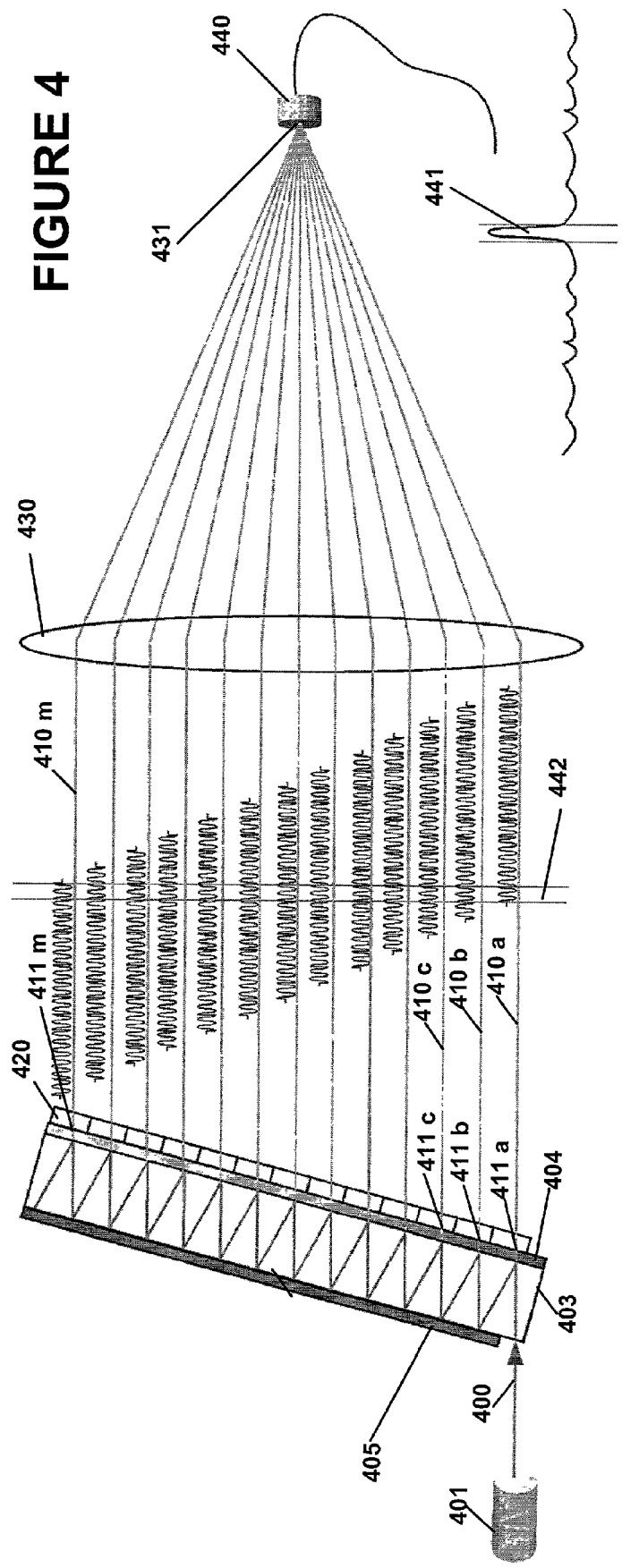
FIG. 4 illustrates an example of a modulation-on-exit space-integrating receiver according to an embodiment of the invention.

A set of receivers can be constructed from the OTDL device. This set of receivers matches the set of transmitters described above. However, the transmitter and receiver linked together need not be of the same type provided they are set to a same code sequence. The code sequence is the ordered set of phase states applied by the spatial light modulator (206 for the programmable encoder) or etched plate (205 for the fixed on-reflection encoder). The code sequence, also known as a chipping code, is used in CDMA techniques to uniquely differentiate each user's signal. A data signal is modulated (encoded) with the code sequence at the point of transmission, and the modulation code is removed at the point of receipt (decoded). FIG. 4 illustrates an example of a modulation-on-exit receiver. In this example, each output point is phase modulated by a spatial light modulator as in the transmitter of the example illustrated in FIG. 2. In FIG. 4, a coherent encoded light beam 400 exits from an optical fiber 401. The input beam preferably enters an OTDL cavity 403. The input beam may be partially reflected by a surface 404. OTDL cavity 403 and surface 404 are analogous to the cavity 203 and the surface 204 as illustrated in FIG. 2. A portion of the light preferably exits the cavity 403 at the first delay tap 411($a$) as a beam 410($a$). The reflected portion of the input beam may continue to a 100% reflective surface 405, where it may be reflected back to the partially reflective surface 404 at a next tap point 411($b$). At this tap point, another portion of the beam may exit the cavity as a beam 410($b$). The input beam may continue to bounce between the surfaces 404 and 405, with portions of the beam exiting the cavity as beams 410($c$)-($m$). The reflective coating of the surface 404 may vary in reflectivity along its length, with high reflectivity at the start and decreasing along its length, so as to ensure equal intensity of the exiting beams. The reflectivity may also vary such as to impart any other desired amplitude profile onto the beams. Upon exiting the surface 404, the beams may enter a phase modulator 420, where a unique phase shift is applied to each beam. The phase modulator 420 may be loaded with a phase pattern that is the inverse phase in reverse order from the phase pattern used to generate the transmitted signal. After the beams have been phase modulated with the reverse phase pattern, the beams may be decoded. The beams may pass through an integration lens 430, where the beams may be reintegrated into a single beam at 431. Thereafter, the beams may enter a photo detector 440 as a decoded beam. The exiting pulses may be aligned in phase as illustrated in 441 and 442. When the phases are aligned, the integrated light beam focuses to a point on the photo detector 440 producing a peak output. At all other times, the light is defocused, i.e., spread out in space. It should be noted that the receiver illustrated in FIG. 4 is analogous to the transmitter of FIG. 2 with the exception that the input is from communications fiber instead of a laser and the output goes to a photo detector instead of a communications fiber.

Figure 5:
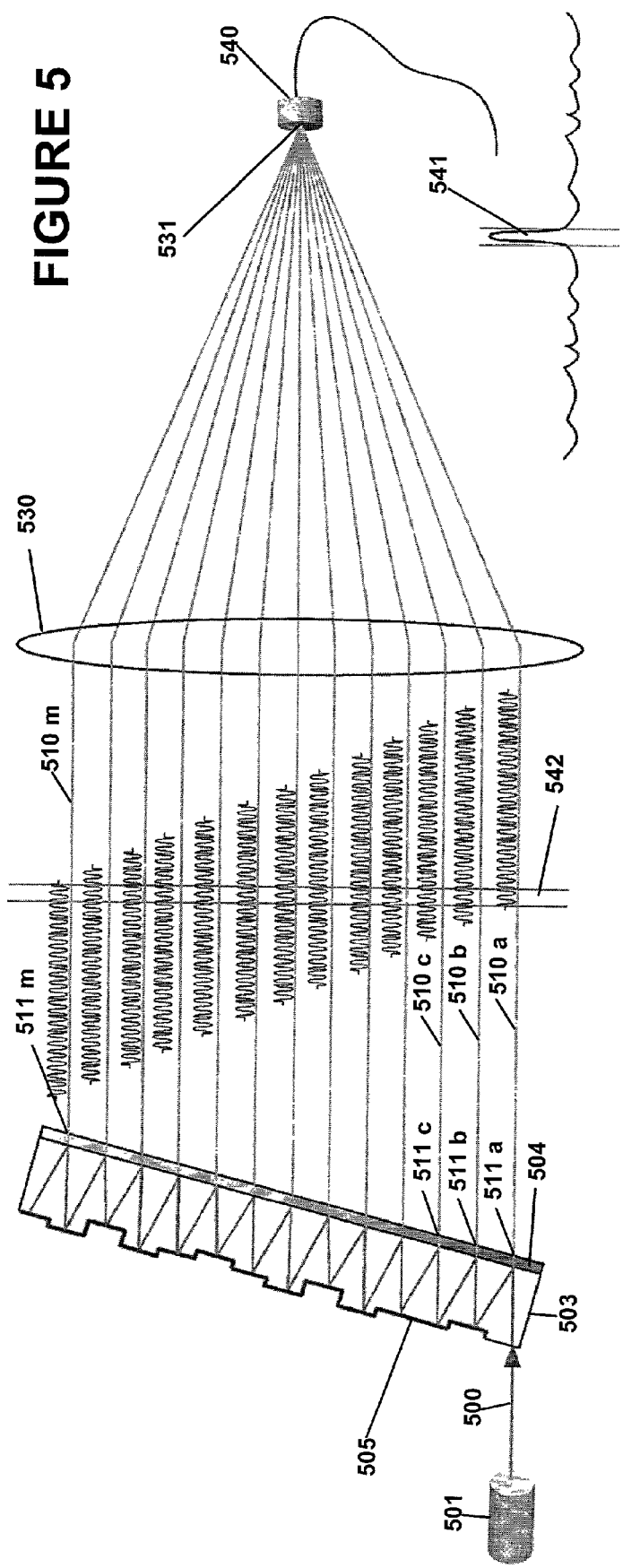
FIG. 5 illustrates an example of a modulation-on-reflection space-integrating receiver according to an embodiment of the invention.

FIG. 5 illustrates an example of the modulation-on-reflection receiver corresponding to the transmitter illustrated in FIG. 3. FIG. 5 illustrates an example of a OCDMA decoder where the pulse of light traveling through the OTDL device is phase adjusted on a back surface of the device using an etched pattern. The etched pattern may be in the inverse reverse accumulated order of the pattern etched on the transmitter illustrated in FIG. 3.

Referring to FIG. 5, a coherent encoded light beam 500 may exit from an optical fiber 501. The input beam 501 preferably enters an OTDL cavity 503 and is partially reflected by a surface 504. The cavity 503 the surface 504 are analogous to cavity 203 and surface 204, as illustrated in FIG. 2. A portion of the light may exit the cavity at a first delay tap 511($a$) as beam 510($a$). The reflected portion of the input beam may continue to a 100% etched reflective surface 505 where it may phase adjusted based on the depth of the etched surface. Then, the beam may be reflected back to the partially reflective surface 504 at a next tap point 511($b$). At this tap point, another portion of the beam, now phase encoded, may exit the cavity 503 as beam 510($b$). The input beam may continue to bounce between surfaces 504 and 505, with portions of the beam exiting the cavity as beams 510($c$)-($m$). The light exiting the device at each tap point may have a phase that is the accumulation of all phase adjustments up to that point. The programmed phase pattern is the differential phase required to produce the desired phase at each tap point. The reflective coating of the surface 504 preferably varies in reflectivity along its length, with high reflectivity at the start and decreasing along its length, so as to ensure equal intensity of the exiting beams. The reflectivity may also vary such as to impart any other desired amplitude profile onto the beams. The total number of delay taps determines the length of the applied code sequence.

After the beams have been phase modulated, they may pass through an integration lens 530. At the integration lens 530, the beams may be reintegrated into a single beam at 531. Thereafter, the beams may enter a photo detector 540 as a decoded beam in which the exiting pulses are aligned in phase as illustrated in 541 and 542. When the phases are aligned, the integrated light beam focuses to a point on the photo detector 540 producing a peak output. At all other times, the light is defocused, i.e., spread out in space. As in the transmitter, illustrated by way of example in FIG. 3, the reflective phase modulation can also be produced by a programmable device such as a spatial light modulator or micro-mechanical device at 505. It should be noted that the construction of the receiver of FIG. 5 is analogous to the transmitter of FIG. 3 with the exception that the input is from a communications fiber instead of a laser, and the output goes to a photo detector instead of a communications fiber.

Figure 6:
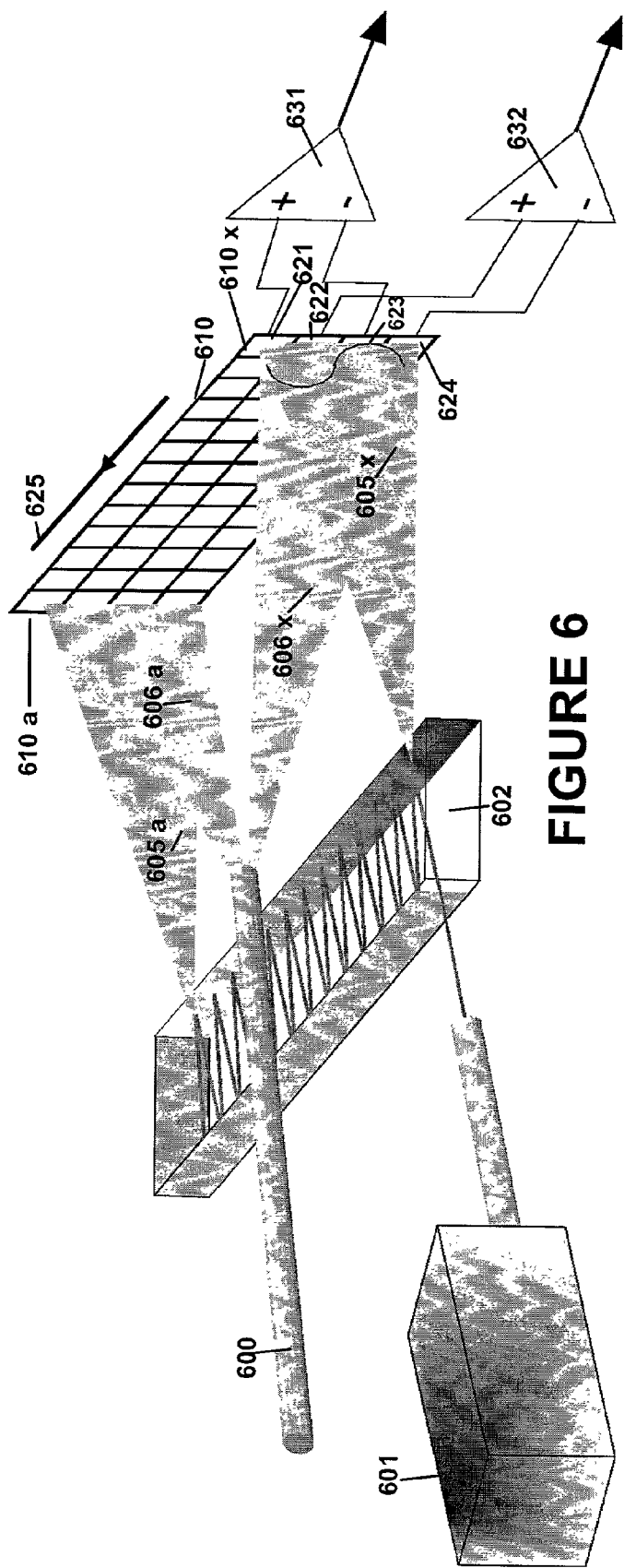
FIG. 6 illustrates an example of time integrating correlating receiver according to an embodiment of the invention.

FIG. 6 illustrates an embodiment of the invention in which a time integrating OCDM correlating receiver is constructed. In this embodiment, an OTDL device 602 is used to produce many simultaneous time-delayed outputs of an input signal from a reference signal generator 601. Each output from the OTDL device 602 illuminates one column of a four-row time integrating photo detector array, as illustrated at 605($a$) and 605($x$). The detector array is also preferably illuminated with a plane wave as illustrated by 606($a$) and 606($x$), formed from an output of a second source, shown in FIG. 6 as the data input fiber 600. The sum of the two beams, which are mutually coherent, may be square-law detected on the photo sensors in array 610. This results in multiplication of the amplitude of the two beams as well as the bias terms from the square of each amplitude. Integration in time of the detected output results in a correlation between the amplitudes of the two beams, with each column of the photo sensor array 610($a$) through 610($x$) being a different time offset 625 of the two beams.

The two illuminations on the photo detector are tilted in phase as a result of the separation of the two illumination sources, 600 and 601, such that the interference between them produces a single cycle of a spatial carrier across the four detector rows. This spatial carrier allows the detection of the complex correlation value. Subtraction of the $3^{rd}$ and $4^{th}$ quadrants of the cycle (623 and 624) from the $1^{st}$ and $2^{nd}$ quadrant (621 and 622) respectively can produce the real (631) and imaginary (632) parts of the desired correlation while removing bias terms resulting from the square-law detection of the sum of the two illuminations.

In the example shown in FIG. 6, a locally generated reference signal 601 is shown as the OTDL input. Further, the received data illuminating the entire array 610 from a point source is represented by the fiber input 600. The receiver may work equally well with the data being input into the OTDL device and the reference signal illuminating the entire device.

The reference signal generator 601 could be an electronically generated reference employing high-speed digital and analog hardware and an optical modulator. It could also be one of the space integrating encoders described above, thus avoiding the need for high-speed electronics.

The point source illuminating the entire array need not be a point source. It could also be a second OTDL device generating a second set of time-delayed outputs, each illuminating one column of the photo detector. In this case, correlations are performed against each of the two sets of time delays. The direction of the time delays may be the same (co-propagating). In this case, the system is a correlator. Otherwise, direction of the time delays may be in opposite directions (counter-propagating). This makes the system a convolver. Either implementation may be used as a time-integrating OCDMA receiver. The choice of which is dependent on the particular application and problem to be solved.

It is also possible to produce a spectral domain signal encoder by modulating the constituent frequency components of the signal by placing an amplitude and phase modulator at the Fourier transform plane formed from the output of an OTDL device fed with a constant broad spectrum light source. In this implementation, the OTDL device acts basically as a channelizer or Fourier Transform processor to illuminate a high-speed spatial light modulator. The spatial light modulator is driven with the desired modulation to be applied to each of the many frequency components of the input signal. The modulated frequency components are transformed into the time-domain and the resultant time-domain signal is transmitted.

As with the phase-modulated encoders described above, a spectral domain matched filter receiver can be constructed as the inverse of the spectral domain signal encoder. The receiver works in exactly the same manner as the spectral domain signal encoder except that the spatial light modulator is driven with the inverse of the data imparted by the signal encoder in order to remove the signal encoding modulation. The inverse transformed data is then the original data signal.

Figure 7:
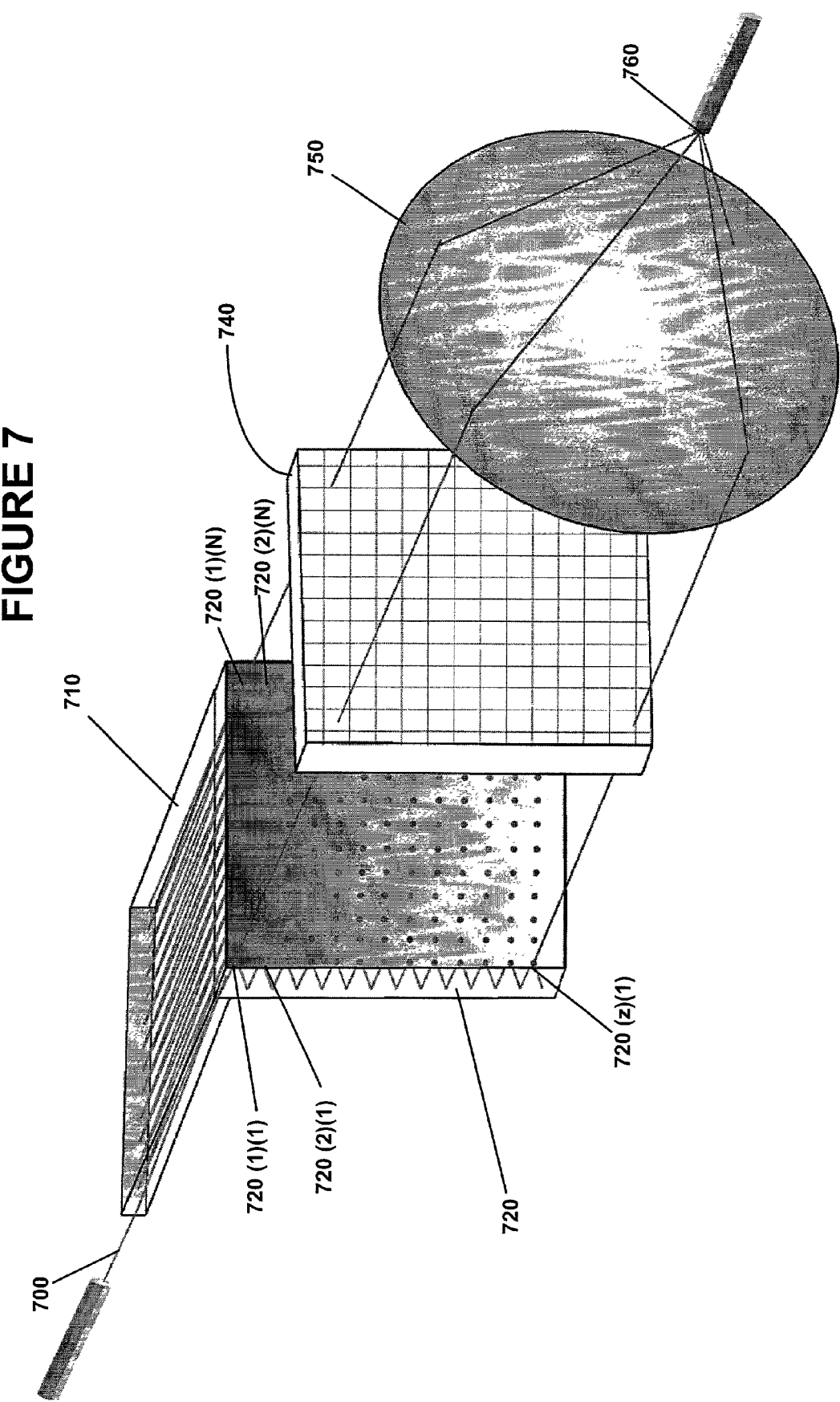
FIG. 7 illustrates an example of a two-dimensional transmitter or receiver.

FIG. 7 illustrates an example of a two-dimensional variation of the space integrating encoders and decoders described above. This implementation uses two OTDL devices to produce a higher number of time offsets. The first (coarse) OTDL produces a long time delay between output taps equal to the total time length of a second two-dimensional OTDL(fine) configured as a bank of one dimensional OTDL's. Each output of the first OTDL feeds one OTDL of the second OTDL.

The two-dimensional concept for the device illustrated in FIG. 7 uses the modulation-on-exit configuration as an example. Any of the aforementioned implementations may be used in the two-dimensional configuration of the device to extend the range of time delays for improved resolution. This implementation will be particularly useful for providing very long code lengths.

In FIG. 7, the light from a fiber (for a receiver/decoder) or laser (for an encoder) 700 may be input to the first, coarse OTDL device 710. As described above, this may produce a series of output taps with a relatively long delay time between each tap. Each output beam of 710 may then be input to one of several OTDL's contained in an OTDL device 720, device 720(1)(1) through 720(z)(1), 720(1)(2) through 720(z)(2), continuing as necessary to 720(1)(N) through 720(z)(N). The total time delay of each OTDL in 720 may be equal to the time delay between output taps of OTDL 710. This configuration produces a continuum of time delays at the outputs of OTDL 720, configured in a raster format with the first delay at 720(1)(1) in the upper left corner, and the longest time delay at the diagonally opposite corner. The time delays progress vertically through each column with the first output of a column being contiguous with the last output of the previous column. As with the one-dimensional OTDL devices described above, each beam output of the OTDL array then preferably passes through a phase modulator 740, where encoding or decoding occurs. The beams may then be reintegrated at lens 750 to converge at 760 where there is either an optical fiber (encoder) or a photo detector (receiver/decoder).

The net effect of the two-dimensional architecture is to produce an array of time delays that is longer in time than a one-dimensional OTDL by a multiplicative factor equal to the number of outputs from the OTDL 710. In practice for an OCDMA transmitter or receiver, this allows the use of much longer bit sequence encoding, thereby increasing the number of possible unique codes, and hence the number of users. Note also that for a one-dimensional OTDL, generating N taps requires N bounces of the light for the longest tap delay. For this two-dimensional architecture, however, only $2\sqrt{N}$ bounces of light are required for the longest delayed tap, thus relaxing some optical quality constraints on the device.

Note that, although BPSK modulation has been addressed in the above descriptions, other spreading modulations such as on-off keyed (OOK), quadrature phase shift keyed (QPSK), quadrature amplitude modulation (QAM), etc. may also be used.

The present invention, as illustrated by way of example above, has several technical advantages over prior art OCDMA methods. The present invention may provide increased efficiency by performing bi-phase (or multi-phase multi-amplitude such as QAM) shifting of light, as opposed to simple on-off keying. Typical OCDMA proposed systems use uni-polar codes that use plus ones (+1) and zeros (0), generally called on-off keying. This inherently reduces optical efficiency because a "0" code transmits no power in an optical system. To increase efficiency, it is far better to use bi-polar codes, i.e. those consisting of plus one (+1) and minus one (−1) and even better to use higher order QAM modulations. Further, the present invention may be self-coherent in its spreading code. In other words, the present invention does not require separate coherent reference and coherent detection to despread the signal. Typical proposed OCDMA systems require separate coherent reference and coherent detection, thereby requiring two separate channels. This is highly inefficient from a perspective of optical efficiency. A further advantage of the present invention is that high-rate code modulation may be produced without the need for high-speed clocks as would be required in a traditional RF CDMA implementation employing high-rate code modulation. Still further, the OTDL of the present invention is a passive device. Thus, the present invention is capable of operating on less power than prior art optical CDMA methods.

What is claimed is:

1. A transmitting system comprising:
   a processor to process at least one collimated input beam which has been modulated with a data signal to produce multiple time-delayed output taps, the processor being configured to maintain the collimation of the input beam so that the multiple time-delayed output taps maintain the collimation of the input beam, the multiple time-delayed output taps being spatially distributed, spatially distinct and independently phase shifted;
   an integration lens to receive the time-delayed output taps and to reintegrate the time-delayed output taps into a single integrated encoded beam with a time series chip sequence;
   an optical fiber to receive the integrated encoded beam from the integration lens and to transmit the integrated encoded beam; and
   a variable reflectivity surface which decreases in reflectivity along its length and which is configured to impart a desired amplitude profile onto the time-delayed output taps.

2. A receiving system comprising:
   a processor to process encoded collimated light beams received from a transmitter to produce multiple time-delayed output taps, the processor being configured to maintain the collimation of the light beams so that the multiple time-delayed output taps maintain the collimation of the light beams, the multiple time-delayed output taps being spatially distributed, spatially distinct and independently phase shifted;

an integration lens to receive the time-delayed output taps and to reintegrate the time-delayed output taps into a single decoded beam;

a photo detector to receive the integrated decoded beam and to generate an output; and a variable reflectivity surface which decreases in reflectivity along its length and which is configured to impart a desired amplitude profile onto the time-delayed output taps.

3. A transmitting system comprising:

an optical tapped delay line device to process at least one collimated input beam which has been modulated with a data signal to produce multiple time-delayed output taps that maintain the collimation of the input beam, the optical tapped delay line device having a cavity with front and back surfaces, wherein one of the front and back surfaces of the cavity phase adjusts the phase of the input beam travelling within the cavity;

an integration lens to receive the time-delayed output taps and to reintegrate the phase modulated output taps into a single integrated encoded beam with a time series chip sequence;

an optical fiber to receive the integrated encoded beam from the integration lens and to transmit the integrated encoded beam; and a variable reflectivity surface which decreases in reflectivity along its length and which is configured to impart a desired amplitude profile onto the time-delayed output taps.

4. The system of claim 3, wherein the optical tapped delay device includes an etched plate having an etch depth sufficient to produce a desired phase shift through the time delayed output taps.

5. A transmitting system comprising:

an optical tapped delay line device to process at least one collimated input beam which has been modulated with a data signal to produce multiple time-delayed output taps that maintain the collimation of the input beam;

a phase modulator to independently phase modulate each of the time-delayed output taps;

an integration lens to receive the phase modulated time-delayed output taps and to reintegrate the phase modulated time-delayed output taps into a single integrated encoded beam with a time series chip sequence;

an optical fiber to receive the integrated encoded beam from the integration lens and to transmit the integrated encoded beam; and a variable reflectivity surface which decreases in reflectivity along its length and which is configured to impart a desired amplitude profile onto the time-delayed output taps.

6. A receiving system comprising:

an optical tapped delay line device to process encoded collimated light beams received from a transmitter to produce multiple time-delayed output taps that maintain the collimation of the light beams;

a phase modulator to independently phase modulate each of the time-delayed output taps;

an integration lens to receive the phase modulated time-delayed output taps and to reintegrate the phase modulated time-delayed output taps into a single decoded beam;

a photo detector to receive the integrated decoded beam and to generate an output; and a variable reflectivity surface which decreases in reflectivity along its length and which is configured to impart a desired amplitude profile onto the phase modulated time-delayed output taps.

7. A receiving system comprising:

an optical tapped delay line device, to process encoded collimated light beams received from a transmitter to produce multiple time-delayed output taps that maintain the collimation of the light beams which are independently phase shifted, the optical tapped delay line device having a cavity with front and back surfaces, wherein one of the front and back surfaces of the cavity phase adjusts the phase of the input beam travelling within the cavity;

an integration lens to receive the time-delayed output taps and to reintegrate the time-delayed output taps into a single decoded beam;

a photo detector to receive the integrated decoded beam and to generate an output; and a variable reflectivity surface which decreases in reflectivity along its length and which is configured to impart a desired amplitude profile onto the time-delayed output taps.

8. The system of claim 7, wherein the multiple time-delayed output taps are mutually phase-shifted by an etched pattern on one of the front and back surface of the cavity as a function of the at least one frequency of the input beam which is an inverse reverse accumulated order of a corresponding pattern etched on the transmitter.

9. A transmitting method comprising:

processing at least one collimated input beam which has been modulated with a data signal to produce multiple time-delayed output taps that maintain the collimation of the input beam, the multiple time-delayed output taps being spatially distributed, spatially distinct and independently phase shifted;

independently phase modulating each of the time-delayed output taps;

receiving the phase modulated time-delayed output taps at an integration lens;

reintegrating the phase modulated time-delayed output taps into a single integrated encoded beam with a time series chip sequence;

receiving, via an optical fiber, the integrated encoded beam from the integration lens;

transmitting the integrated encoded beam; and providing a variable reflectivity surface which decreases in reflectivity along its length and which is configured to impart a desired amplitude profile onto the time-delayed output taps.

10. A receiving method comprising:

processing encoded collimated light beams received from a transmitter to produce multiple time-delayed output taps that maintain the collimation of the light beams, the multiple time-delayed output taps being spatially distributed, spatially distinct and independently phase shifted;

receiving, at an integration lens, the time-delayed output taps;

reintegrating the time-delayed output taps into a single decoded beam;

receiving the integrated decoded beam at a photo detector;

generating an output from the integrated decoded beam; and providing a variable reflectivity surface which decreases in reflectivity along its length and which is configured to impart a desired amplitude profile onto the time-delayed output taps.

11. A transmitting method comprising:
processing, with an optical tapped delay line device, at least one collimated input beam which has been modulated with a data signal to produce multiple time-delayed output taps that maintain the collimation of the input beam, the optical tapped delay line device having a cavity with front and back surfaces, wherein one of the front and back surfaces of the cavity phase adjusts the phase of the input beam travelling within the cavity;
receiving, at an integration lens, the time-delayed output taps;
reintegrating the time-delayed output taps into a single integrated encoded beam with a time series chip sequence;
receiving, at an optical fiber, the integrated encoded beam from the integration lens;
transmitting the integrated encoded beam; and
providing a variable reflectivity surface which decreases in reflectivity along its length and which is configured to impart a desired amplitude profile onto the time-delayed output taps.

12. A receiving method comprising:
processing encoded collimated light beams received from a transmitter to produce multiple time-delayed output taps that maintain the collimation of the light beams, the multiple time-delayed output taps being spatially distributed;
independently phase modulating each of the time-delayed output taps being spatially distributed, spatially distinct;
independently phase modulating each of the time-delayed output taps;
receiving, at an integration lens, the phase shifted time-delayed output taps;
reintegrating the phase shifted time-delayed output taps into a single integrated decoded beam;
receiving the integrated decoded beam at a photo detector;
generating an output from the integrated decoded beam; and
providing a variable reflectivity surface which decreases in reflectivity along its length and which is configured to impart a desired amplitude profile onto the time-delayed output taps.

13. A transmitting method comprising:
processing, with an optical tapped delay line device, at least one collimated input beam which has been modulated with a data signal to produce multiple time-delayed output taps that maintain the collimation of the input beam;
independently phase modulating each of the time-delayed output taps;
receiving, at an integration lens, the phase modulated time-delayed output taps;
reintegrating the phase modulated time-delayed output taps into a single integrated encoded beam with a time series chip sequence;
receiving, at an optical fiber, the integrated encoded beam from the integration lens;
transmitting the integrated encoded beam; and
providing a variable reflectivity surface which decreases in reflectivity along its length and which is configured to impart a desired amplitude profile onto the time-delayed output taps.

14. A receiving method comprising:
processing, with an optical tapped delay line device, encoded collimated light beams received from a transmitter to produce multiple time-delayed output taps that maintain the collimation of the light beams which are independently phase shifted, the optical tapped delay line device having a cavity with front and back surfaces, wherein one of the front and back surfaces of the cavity phase adjusts the phase of the input beam travelling within the cavity;
receiving, at an integration lens, the phase shifted time-delayed output taps;
reintegrating the phase shifted time-delayed output taps into a single decoded beam;
receiving the integrated decoded beam at a photo detector;
generating an output from the integrated decoded beam; and
providing a variable reflectivity surface which decreases in reflectivity along its length and which is configured to impart a desired amplitude profile onto the time-delayed output taps.

15. The system of claim 1, wherein the modulation can be implemented in a spectral domain.

16. The system of claim 2, wherein the modulation can be implemented in a spectral domain.

17. The system of claim 3, wherein the modulation can be implemented in a spectral domain.

18. The system of claim 5, wherein the modulation can be implemented in a spectral domain.

19. The system of claim 6, wherein the modulation can be implemented in a spectral domain.

20. The system of claim 7, wherein the modulation can be implemented in a spectral domain.

21. The system of claim 1, wherein the system can be used as an optical equalizer.

22. The system of claim 2, wherein the system can be used as an optical equalizer.

23. The system of claim 3, wherein the system can be used as an optical equalizer.

24. The system of claim 5, wherein the system can be used as an optical equalizer.

25. The system of claim 6, wherein the system can be used as an optical equalizer.

26. The system of claim 7, wherein the system can be used as an optical equalizer.

27. The system of claim 1, wherein the system can be used in wide-band signal generation.

28. The system of claim 2, wherein the system can be used in wide-band signal generation.

29. The system of claim 3, wherein the system can be used in wide-band signal generation.

30. The system of claim 5, wherein the system can be used in wide-band signal generation.

31. The system of claim 6, wherein the system can be used in wide-band signal generation.

32. The system of claim 7, wherein the system can be used in wide-band signal generation.

33. A receiving system comprising:
an optical tapped delay line device having a cavity to process at least one collimated input beam to produce multiple time delayed spatially distributed, spatially distinct output taps in a linear array, the cavity being configured to maintain the collimation of the input beam so that the multiple time-delayed output taps maintain the collimation of the input beam;
a second input beam which projects at an angle to a plane of the optical tapped delay line linear array to interfere with each optical tapped delay line beam and establish a region of spatial overlap of the optical tapped delay line beams;

a two-dimensional photo detector array arranged to sample the interfering beams and spatially operate on the beams in the regions of spatial overlap;

an electronic amplifier to sample the two-dimensional photo detector array; and a variable reflectivity surface which decreases in reflectivity along its length and which is configured to impart a desired amplitude profile onto the time-delayed output taps.

34. The system of claim 33, wherein the optical tapped delay line input beam is modulated with a data signal and the second input beam is a coherent reference.

35. The system of claim 33, wherein the optical tapped delay line input beam is a coherent reference and the second input beam is modulated with a data signal.

36. A receiving system comprising:

an optical tapped delay line device having a cavity to process at least one collimated input beam to produce multiple time delayed spatially distributed, spatially distinct output taps in a linear array, the cavity being configured to maintain the collimation of the input beam so that the multiple time-delayed output taps maintain the collimation of the input beam;

a second optical tapped delay line device having a cavity to process at least one collimated input beam to produce multiple time delayed spatially distributed, spatially distinct output taps in a linear array, the cavity being configured to maintain the collimation of the input beam so that the multiple time-delayed output taps maintain the collimation of the input beam, wherein each optical tapped delay line beam interferes with the corresponding beam of the first optical tapped delay line and establishes a region of spatial overlap of the optical tapped delay line beams;

a two-dimensional photo detector array arranged to sample the interfering beams and spatially operate on the beams in the regions of spatial overlap;

an electronic amplifier to sample the two-dimensional photo detector array; and a variable reflectivity surface which decreases in reflectivity along its length and which is configured to impart a desired amplitude profile onto the time-delayed output taps.

37. The system of claim 36, wherein output tap to output tap delays propagate in a same direction in the optical tapped delay line device and the second optical tapped delay line device and an output of the receiving system is a correlation of the signals on the input beams.

38. The system of claim 36, wherein output tap to output tap delays propagate in opposite directions in the optical tapped delay line device and the second optical tapped delay line device, and an output of the receiving system is a convolution of the signals on the input beams.

* * * * *